(12) United States Patent
Zusatz et al.

(10) Patent No.: US 7,726,400 B2
(45) Date of Patent: Jun. 1, 2010

(54) COMPOSITIONS AND METHODS FOR TREATING LOST CIRCULATION

(75) Inventors: Benedicte Zusatz, Chatenay Malabry (FR); Frederik Nilsson, Villebon sur Yvette (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/556,867

(22) PCT Filed: May 12, 2004

(86) PCT No.: PCT/EP2004/005124

§ 371 (c)(1), (2), (4) Date: Aug. 28, 2006

(87) PCT Pub. No.: WO2004/101463

PCT Pub. Date: Nov. 25, 2004

(65) Prior Publication Data

US 2007/0169936 A1    Jul. 26, 2007

Related U.S. Application Data

(60) Provisional application No. 60/470,341, filed on May 14, 2003.

(51) Int. Cl.
*E21B 33/13*    (2006.01)

(52) U.S. Cl. ..................................... 166/293; 166/300

(58) Field of Classification Search .................... None
See application file for complete search history.

(56) References Cited

U.S. PATENT DOCUMENTS

| | | | | |
|---|---|---|---|---|
| 3,448,800 A * | 6/1969 | Wahl et al. | ................... | 166/294 |
| 4,664,816 A * | 5/1987 | Walker | ....................... | 507/103 |
| 4,724,906 A * | 2/1988 | Sydansk | ...................... | 166/295 |
| 5,945,387 A * | 8/1999 | Chatterji et al. | ............. | 507/224 |
| 6,105,674 A * | 8/2000 | Liao et al. | .................... | 166/292 |
| 6,581,701 B2 * | 6/2003 | Heying | ......................... | 175/72 |
| 6,983,799 B2 * | 1/2006 | Reddy et al. | ................. | 166/291 |
| 2004/0168802 A1 * | 9/2004 | Creel et al. | .................. | 166/293 |

FOREIGN PATENT DOCUMENTS

WO    WO9510764    *  4/1995

* cited by examiner

*Primary Examiner*—Jennifer H Gay
*Assistant Examiner*—Angela M DiTrani
(74) *Attorney, Agent, or Firm*—David Cate; Robin Nava; Jeff Griffin

(57) ABSTRACT

A cement system for use in treating lost circulation includes a slurry of cement, water and a super-absorbent polymer which absorbs free water in the slurry to form a gel—ore preferably a solid-like structure—when placed in the well, and which releases the absorbed water to the cement hydration reaction as the cement sets. The absorption of water causes the slurry to develop a solid-like structure. In one embodiment, the superabsorbent is polyacrylamide or modified crosslinked poly(meth)acrylate. Also presented is a method of treating lost circulation by pumping the above-mentioned cement system.

13 Claims, No Drawings

COMPOSITIONS AND METHODS FOR TREATING LOST CIRCULATION

CROSS-REFERENCE TO RELATED APPLICATIONS

This application is the U.S. national stage application of International Application PCT/EP04/05124, filed May 12, 2004, which international application was published on Nov. 25, 2004, as International Publication No. WO 2004/101463 in the English language. The International Application claims priority of U.S. Provisional Application No. 60/470341 filed on May 14, 2003.

TECHNICAL FIELD OF THE INVENTION

The present invention relates to treatment of lost circulation during the drilling of a well and in particular, to methods involving the use of cement slurries for curing lost circulation issues.

BACKGROUND OF THE INVENTION

During the construction of underground wells, it is common, during and after drilling, to place a liner or casing, secured by cement pumped into the annulus around the outside of the liner. The cement serves to support the liner and to provide isolation of the various fluid-producing zones through which the well passes. This later function is important since it prevents fluids from different layers contaminating each other. For example, the cement prevents formation fluids from entering the water table and polluting drinking water, or prevents water from passing into the well instead of oil or gas.

A problem which is encountered in the placement of cement in wells is the development of gel strength in situations in which materials are easily lost from the cement slurry before it is set in the correct position. One example of this is in the placement of cement for lost circulation problems. In normal cement systems, the cement is pumped into the well in a slurry that is very fluid and gel strength develops during the early part of the setting reaction. However, this can take a significant time during which some or all of the components of the cement slurry can be lost to the formation. It has been proposed to add fibers to cement slurries to help build a filter cake and retain the cement in position. However, the lack of a gel structure still makes loss of materials to the formation a problem.

It is an objective of the present invention to provide well cementing systems that can be placed by pumping in the normal manner, and which contain materials that favor the development of the gel strength for curing lost circulation.

SUMMARY OF THE INVENTION

In accordance with the invention, there is provided a system which adapts downhole to allow lost circulation problem to be addressed. By using super-absorbent copolymers, liquid water is quickly removed from the slurry, which is transformed into a solid-like material with certain gel strength and with little or no flow. In many cases when lost circulation problems are faced, the importance of changing a pumpable lost circulation treatment material into a non-pumpable one and with solid-like properties, as soon as the target zone is reached, cannot be underestimated. This is particularly true when cross-flow is present down-hole and which, may "wash away" any lost circulation treatment, unless the treatment "set" and block the cross-flow instantly when applied.

The term "solid-like structure" is used here to indicate that the water in the slurry that makes it pumpable and flowable has been removed (by the super-absorbent polymer) such that what is left has more of the characteristic of a solid than a liquid slurry.

Super-absorbent copolymers can rapidly transform a cement slurry, having the necessary rheological properties to be pumpable, into something that is solid-like and with high extrusion strength. This does not mean that cement has "set" at this stage but has merely lost its flowing properties. The water content remains the same in the slurry but the super-absorbent material has immobilized it.

DETAILED DESCRIPTION

Due to the nature of super-absorbent copolymers they will, as soon as in contact with water, start absorbing it forming a solid-like structure. As a consequence, to avoid any change in the cement slurry rheology during placement, the super-absorbent copolymers need to be protected from water contact until the lost circulation target zone has been reached. The preferred way of protecting the super-absorbent copolymer is encapsulation. There are different types of encapsulation and with different related release mechanisms. Two common types of encapsulation are resins and mineral oxides of e.g. silica or aluminum.

Resin encapsulation can use temperature as the release mechanism. Above a certain temperature the resin will melt and the copolymer is released. There are different types of resins with a range of melting points and the must be taken into account for well cementing applications with large temperature variations.

Using different types of mineral oxides, forming a "hard cover" round the copolymer is another solution. The release mechanism in this case is pressure. The pressure resistance of the "hard cover" will depend upon the chemical composition as well as the thickness of the covering layer.

A further solution to protect the super-absorbent copolymer from water contact is an inverse emulsion where the copolymer is dispersed in the oil-continuous phase. There are several different ways of triggering emulsion inversion downhole and transforming the water-in-oil emulsion into an oil-in-water emulsion. A good example of emulsion inversion has been described in WO94280855 and PCT-NO94-00163 where a pressure drop through the bit nozzles is used to trigger the inversion of a water-in-oil emulsion into an oil-in-water emulsion.

A further approach is to use a down-hole release tool. In such a case, the copolymer system is protected "mechanically" until the target zone has been reached and where it is released.

Two types of super-absorbent copolymers are considered as particularly useful. The first is a copolymer of poly(2-propenamide-co-2-propenoic acid, sodium salt). The second super-absorbent copolymer is a sodium polyacrylate and presented as a comparison to demonstrate the particular properties of the first. Other SAP such as polyacrylamide or modified crosslinked poly(meth)acrylate are also interested for self healing applications.

These types of copolymers are made up of cross-linked polymers, which swell into a gel when in contact with water. The swelling is a consequence of electrostatic repulsion between charge sites on the copolymers in the presence of water. The addition of highly concentrated salt solution will make the gel collapse instantly due to the screening of the charged site on the copolymer. The sensitivity towards high salinity has at least one drawback but also advantages.

The major drawback is that in the presence of ions in the water, the copolymer will swell less as well as lose some of its gel strength compared with fresh water. This is the case when used in e.g. cement where high concentrations of calcium ions are present.

One advantages is that in the event that a cement-copolymer system becomes solid-like in the wrong location, for example inside a drillpipe or a casing, a concentrated salt solution can be pumped to make the gel collapse with a regained low rheology. Saturated sodium chloride water solution has proven to be highly efficient to make the gel collapse. A solid-like cement obtained with a cement-copolymer system based on a 15.8 ppg cement slurry with 1.00% BWOW (percent by weight of water) of a copolymer (copolymer A, see explanation below) can be rapidly transformed back into a slurry by treatment with a saturated NaCl water solution. The rheology directly after the adding 33% (by volume of the solid-like cement-copolymer) of the salt solution gave a PV of 22.3 cP and a $\tau_y$ of 6.0 lbf/ft$^2$. This rheology is similar to any standard and pumpable cement slurry.

Another advantage is that this cement-copolymer slurry can be used when drilling faulted reservoirs. Placing a solid-like cement-copolymer system would assure "safe" and easy drilling in this type of reservoirs. When drilling is finished, a saturated salt solution could be used to remove the solid-like cement-copolymer and the initial reservoir properties would be regained.

In Table 1, some physical properties of the copolymers, A, B and C are presented. The copolymers A and B are of the poly(2-propenamide-co-2-propenoic acid, sodium salt) type whereas C is based on sodium acrylate. From here and on, the super-absorbent copolymers described in this patent memo will be referred to as copolymers A, B and C.

TABLE 1

Physical properties of the copolymers A, B and C.

| Copolymer | Appearance | Granular dimension | Density |
|---|---|---|---|
| A | Light tan granular powder | 98% <850 µm | 1.473 g/cm$^3$ |
| B | Light tan granular powder | 98% <850 µm<br>20% <75 µm | 1.187 g/cm$^3$ |
| C | White granular powder | 33% 500-850 µm<br>66% 106-500 µm | 1.617 g/cm$^3$ |

In Table 2, the water absorbency of copolymers A, B and C are presented. Copolymers A and B have a significantly better capacity of absorbing distilled water than copolymer C although C is also considered as a super-absorbent copolymer. Table 2, also demonstrates that super-absorbent copolymers are sensitive to the presence of salt in the water. In this particular case 1% BWOW of NaCl was used which reduces the absorbing capacity by a factor of 10.

TABLE 2

Water absorbency of copolymers A, B and C. The water absorbency is expressed as gram (g) of water absorbed per gram (g) of dry copolymer.

| Copolymer | Water absorbency (tap water) | NaCl (1 wt %) in distilled water |
|---|---|---|
| A | 270 g/g | 75 g/g |
| B | 270 g/g | 90 g/g |
| C | 220 g/g | — |

In Table 3, the obtained results from measuring the gel strength using a HAAKE Rotovisc RV12 are presented. For this particular measurement, samples of copolymers A, B and C were prepared in a beaker using 1.5 gram of each respectively, mixed with 150 g distilled water giving a final concentration of 1% BWOW. The measurements were performed at ambient temperature and pressure.

TABLE 3

The measured gel strength of a 1.00-% BWOW solution of copolymers A, B and C respectively. The tests were performed under ambient temperature and pressure conditions.

| Copolymer | Gel Strength (lbf/100 ft$^2$) | Gel strength (Pa) |
|---|---|---|
| A | 266 | 127 |
| B | 183 | 88 |
| C | 699 | 335 |

The gel strength and the solid-like nature of a lost circulation treatment once at its target zone is important. A low gel strength value will most likely result in low extrusion strength once the copolymer is placed in a lost circulation zone e.g. fractured or cavernous formation. However, a low water (fluid) absorbency will enhance the risk that the copolymer will be "washed away" before any gel strength has been built up. To overcome this problem, a small amount of copolymer can be dry blended with cement to form a slurry.

In Table 4, 5 and 6, the results from mixing copolymers A, B and C with class G cement at densities of 15.8 ppg (pounds per gallon), 14 ppg and 12 ppg respectively are presented. For each different case, the slurry rheology has been measured using a Chan 35 rheometer (unless other stated) and compared with neat class G cement. In some cases, when the rheology was too high to measure using the Chan 35, a HAAKE Rotovisc RV12 was used to obtain the gel strength instead. The cement slurry is based on cement, water (corresponding to the density for each particular case), a dispersing agent at a constant concentration of 0.04 gps (gallons per sack cement) and an anti-foam agent at a concentration of 0.02 gps. API mixing procedure has been applied.

TABLE 4

Copolymers A, B and C have been dry blended with Class G cement, water corresponding to a 15.8 ppg slurry, a dispersing agent (0.04 gps) and an anti-foam agent (0.02 gps). The rheology results are compared with a neat Class G cement, that is without any copolymer. The rheology where measured with a Chan 35 Rheometer unless otherwise stated.

| System | Copolymer (% BWOW) | Plastic viscosity (PV) | Yield Strength ($\tau_y$) |
|---|---|---|---|
| Neat class G slurry | 0.00 | 6.1 cP | 23.2 lbf/100 ft$^2$ |
| Copolymer A + class G | 0.50 | 13.2 cP | 40.5 lbf/100 ft$^2$ |
| Copolymer A + class G | 0.75 | too viscous | too viscous |
| Copolymer A + class G | 1.00 | too viscous | ~1500 lbf/100 ft$^2$* |
| Copolymer B + class G | 0.50 | too viscous | too viscous |
| Copolymer B + class G | 0.75 | too viscous | too viscous |
| Copolymer B + class G | 1.00 | too viscous | >3000 lbf/100 ft$^2$* |
| Copolymer C + class G | 1.00 | 30.1 cP | 8.6 lbf/100 ft$^2$ |

*Value obtained using a HAAKE Rotovisc RV12.

In Table 4, the results from a 15.8 ppg slurry are presented. The results clearly show that the addition of copolymer A or B have a significant influence upon the cement slurry rheology resulting in an instant solid-like formation with a non-measurable rheology. For copolymer A, a reasonable low slurry rheology is obtained at a concentration of 0.50% BWOW but at a concentration of 0.75 BWOW and above a solid-like cement-polymer structure is obtained. In the case of copolymer B, the three concentrations tested viz. 0.50, 0.75 and 1.00-% BWOW all give rise to the formation of an instant gel. Copolymer C has some effect upon the slurry rheology at a concentration of 1.00-% BWOW but the slurry remains pumpable.

TABLE 5

Copolymers A, B and C have been dry blended with Class G cement, water corresponding to a 14.0 ppg slurry, a dispersing agent (0.04 gps) and an anti-foam agent (0.02 gps). The rheology results are compared with a neat Class G cement, that is without any copolymer. The rheology where measured with a Chan 35 Rheometer unless otherwise stated.

| System | Copolymer conc. % BWOW | Plastic viscosity (PV) | Yield Strength ($\tau_y$) |
|---|---|---|---|
| Neat class G slurry | 0.00 | 6.5 cP | 1.6 lbf/100 ft$^2$ |
| Copolymer A + class G | 0.50 | 3.0 cP | 14.4 lbf/100 ft$^2$ |
| Copolymer A + class G | 0.75 | 25.6 cP | 8.7 lbf/100 ft$^2$ |
| Copolymer A + class G | 1.00 | 40.4 cP | 10.9 lbf/100 ft$^2$ |
| Copolymer B + class G | 1.00 | too viscous | ~285 lbf/100 ft$^2$* |
| Copolymer C + class G | 0.50 | 7.2 cP | 1.9 lbf/100 ft$^2$ |
| Copolymer C + class G | 0.75 | 7.9 cP | 1.4 lbf/100 ft$^2$ |
| Copolymer C + class G | 1.00 | 7.1 cP | 1.7 lbf/100 ft$^2$ |

*Value obtained using a HAAKE Rotovisc RV12.

In Table 5, the results from the 14 ppg cement slurries are presented. A 14 ppg cement slurry has a higher water-cement ratio and this is clearly reflected in the results for copolymer A. In Table 5, results from different concentrations of copolymers A, B and C are presented. Copolymer A shows the expected behavior: increased polymer concentration resulting in increased rheology. Although the increased rheology when increasing the concentration of polymer A from 0.50% BWOW, to 0.75% BWOW and finally 1.00% BWOW the slurry rheology remains reasonable and pumpable. To obtain the desired "instant" solid-like state the concentration needs to be further increased and above 1.00% BWOW. In the case of copolymer B, an instant solid-like structure is formed similar as in the 15.8 ppg case.

It is interesting to note that copolymer C has no influence at all on the slurry rheology when the concentration is increased to levels similar to polymer A, from 0.50% BWOW to 1.00% BWOW. The slurry rheology obtained using polymer C remains stable and basically the same as the neat 14 ppg class G.

TABLE 6

Copolymers A has been dry blended with Class G cement, water corresponding to a 12.0 ppg slurry, a dispersing agent (0.04 gps) and an anti-foam agent (0.02 gps). The rheology results are compared with a neat Class G cement, that is without any copolymer. The rheology where measured with a Chan 35 Rheometer unless otherwise stated.

| System | Copolymer conc. % BWOW | Plastic viscosity (PV) | Yield Strength ($\tau_y$) |
|---|---|---|---|
| Neat class G slurry | 0.00 | 3.9 cP | 0.2 lbf/100 ft$^2$ |
| Copolymer A + class G | 1.00 | 9.9 cP | 0.9 lbf/100 ft$^2$ |
| Copolymer A + class G | 1.50 | 45.2 cP | 13.8 lbf/100 ft$^2$ |
| Copolymer A + class G | 2.00 | too viscous | ~450 lbf/100 ft$^2$* |
| Copolymer A + class G | 2.50 | too viscous | too viscous |

*Value obtained using a HAAKE Rotovisc RV12.

In Table 6 copolymer A has been dry blended with class G cement to obtain a 12 ppg slurry and then compared with neat class G cement at various copolymer concentrations in the range from 1.00 to 2.50% BWOW. At a copolymer concentrations of 1.00 and 1.50-% BWOW the slurry remains fluid with reasonable low rheology for a pumpable slurry. However, at a concentration of 2.00% BWOW and above the "instant" cement-copolymer solid-like structure is formed similar to those presented in Table 4.

The invention claimed is:

1. A pumpable cement slurry for treating lost circulation, comprising cement, water and a super-absorbent polymer selected from the group consisting of poly(2-propenamide-co-2-propenoic acid sodium salt), polyacrylamide and modified crosslinked poly(meth)acrylate, wherein the super-absorbent polymer is present in the slurry in an encapsulated form to prevent formation of the solid-like structure before the slurry is placed in the well and wherein the super-absorbent polymer absorbs free water in the slurry when the slurry is placed in a well.

2. The slurry of claim 1, wherein the absorption of water causes the slurry to develop a solid-like structure.

3. The slurry of claim 1, wherein the encapsulation is in the form of a resin that releases the polymer in response to exposure to temperature.

4. The slurry of claim 1, wherein the encapsulation is in the form of a mineral system that releases the encapsulated material in response to pressure.

5. The slurry of claim 1, wherein the dry super-absorbent polymer has a granular dimension of less than about 850 μm.

6. The slurry of claim 1, wherein the super-absorbent polymer is present in a concentration up to 2.50% BWOW (percentage by weight of water).

7. The slurry of claim 1, wherein the super-absorbent polymer is present in the slurry in an encapsulated form to prevent formation of a solid structure before the slurry is placed in the well.

8. The slurry of claim 7, wherein the encapsulation is in the form of a resin that releases the polymer in response to exposure to temperature.

9. The slurry of claim 7, wherein the encapsulation is in the form of a mineral system that releases the encapsulated material in response to pressure.

10. A method of treating lost circulation in a well comprising the following steps:
    (i) preparing a slurry comprising cement, water and a super-absorbent polymer, wherein the super-absorbent polymer is selected from the group consisting of poly(2-propenamide-co-2-propenoic acid sodium salt), polyacrylamide and modified crosslinked poly(meth)acrylate and wherein the super-absorbent polymer is present in the slurry in an encapsulated form to prevent formation of the solid-like structure before the slurry is placed in the well;
    (ii) pumping the slurry into a region of lost circulation in the well;
    (iii) causing the slurry to form a solid-like structure in that region; and
    (iv) allowing the slurry to set.

11. The method of claim 10, wherein the cement slurry is pumped through a drill bit and the release of the super-absorbent polymer is triggered by a pressure drop occurring through bit nozzles.

12. The method of claim 10, wherein the encapsulation is in the form of a resin that releases the polymer in response to exposure to temperature.

13. The method of claim 10, wherein the encapsulation is in the form of a mineral system that releases the encapsulated material in response to pressure.

* * * * *